United States Patent
Lochner et al.

(10) Patent No.: US 7,035,598 B2
(45) Date of Patent: Apr. 25, 2006

(54) MODULAR COMPUTER SYSTEM

(75) Inventors: Scott Lochner, 3615 Thorndale Rd., Pasadena, CA (US) 91107; Meir Bartur, Los Angeles, CA (US)

(73) Assignee: Scott Lochner, Pasadena, CA (US)

(*) Notice: Subject to any disclaimer, the term of this patent is extended or adjusted under 35 U.S.C. 154(b) by 408 days.

(21) Appl. No.: 09/994,521

(22) Filed: Nov. 26, 2001

(65) Prior Publication Data

US 2002/0077067 A1    Jun. 20, 2002

Related U.S. Application Data

(60) Division of application No. 08/332,499, filed on Oct. 31, 1994, which is a continuation of application No. 08/120,649, filed on Sep. 13, 1993, now abandoned, which is a continuation of application No. 07/642,831, filed on Jan. 18, 1991, now abandoned.

(51) Int. Cl.
  *H04B 1/38*    (2006.01)
(52) U.S. Cl. ............... 455/90.3; 455/349; 455/351; 345/156
(58) Field of Classification Search ............ 445/73, 445/566, 90.1, 90.2, 90.3, 351, 347–349, 445/344, 557, 556.1, 2, 66.1; 345/173, 169, 345/156; 370/338
See application file for complete search history.

(56) References Cited

U.S. PATENT DOCUMENTS

| | | | |
|---|---|---|---|
| 4,530,069 A | 7/1985 | Desrochers | 395/325 |
| 4,534,012 A * | 8/1985 | Yokozawa | 368/327 |
| 4,569,421 A | 2/1986 | Sandstedt | 186/39 |
| 4,628,541 A | 12/1986 | Beavers et al. | |
| 4,649,373 A | 3/1987 | Bland et al. | |
| 4,725,694 A * | 2/1988 | Auer et al. | 345/173 |
| 4,754,326 A | 6/1988 | Kram et al. | |
| 4,763,291 A | 8/1988 | Schwaber | |
| 4,769,764 A | 9/1988 | Levanon | 364/708 |
| 4,775,928 A | 10/1988 | Kendall et al. | 395/725 |
| 4,853,682 A * | 8/1989 | Asano et al. | 345/169 |
| 4,969,830 A | 11/1990 | Daly et al. | 439/136 |
| 5,007,085 A | 4/1991 | Greanias et al. | 380/25 |
| 5,029,183 A * | 7/1991 | Tymes | 370/338 X |
| 5,030,128 A | 7/1991 | Herron et al. | 439/372 |
| 5,081,628 A | 1/1992 | Maekawa et al. | 371/34 |
| 5,126,954 A | 6/1992 | Morita | 364/708 |
| 5,157,687 A | 10/1992 | Tymes | 375/1 |
| 5,195,183 A | 3/1993 | Miller et al. | 395/275 |
| 5,265,238 A | 11/1993 | Canova, Jr. et al. | 395/500 |
| 5,295,064 A * | 3/1994 | Malec et al. | 340/5.91 X |
| 5,309,351 A | 5/1994 | McCain et al. | 364/132 |
| 5,339,239 A | 8/1994 | Manabe et al. | 364/401 |
| 5,367,452 A | 11/1994 | Gallery et al. | 364/401 |
| 5,414,817 A | 5/1995 | Ezzet et al. | 395/275 |

* cited by examiner

*Primary Examiner*—Nay Maung
*Assistant Examiner*—Philip J. Sobutka
(74) *Attorney, Agent, or Firm*—Fish & Richardson P.C.

(57) ABSTRACT

A computer system composed of a storage and control unit including components for receiving and processing input data signals and components for producing output signals based on the input data signals; an input/output unit including components for generating input signals and output components for providing a display based on output signals; and a wireless link between the units for conducting data signals from the components for generating input signals to the components for receiving and processing input signals and for conducting output signals from the components for producing output signals to the output components.

12 Claims, 2 Drawing Sheets

MODULAR COMPUTER SYSTEM

CROSS-REFERENCE TO RELATED APPLICATIONS

This application is a divisional application of and claims priority to U.S. patent application Ser. No. 08/332,499, filed Oct. 31, 1994, which is a continuation of U.S. patent application Ser. No. 08/120,649, filed Sep. 13, 1993, now abandoned which is a continuation of U.S. patent application Ser. No. 07/642,831, filed Jan. 18, 1991 now abandoned.

BACKGROUND OF THE INVENTION

The present invention relates to microcomputers, or personal computers, as well as larger computers, and is particularly concerned with improving the freedom of movement of the users of such computers and enhancing the possibilities of sharing of a single computer system by a plurality of users.

While computers having a full range of capabilities have grown progressively smaller, even the smallest full-feature computer currently on the market is installed and used at a single work location.

A special class of computers, laptops, offers the advantage of freeing the user from their work station and allowing the computer to be transported and used anywhere. Of course, this freedom and flexibility of use are at the expense of important operating features, most notably storage capacity and display capability, and secondarily memory capacity. Because of limitations involving the relation between storage and memory capacities and cost, available laptops can run only a limited number of the available business and scientific programs or are extremely expensive.

It is also known in the art to interconnect, or network, a number of computers, by cable or wireless links, to facilitate the exchange of data and programs between users and to allow sharing of peripherals. However, this technique involves the interconnection of complete computers which normally remain at fixed locations.

Up to the present, there has been no system which would allow the user to move easily and quickly from one location to another while enjoying all of the operating capabilities of a full-size microcomputer, although such a system would be quite desirable in many situations.

SUMMARY OF THE INVENTION

It is an object of the present invention to increase the mobility of a personal computer user while retaining all of the capabilities of a conventional personal computer.

Another object of the invention is to allow the user to change locations, at least over a limited area, while exerting full control over the computer.

A further object of the invention is to facilitate displacement of the input and output ports of such a computer.

Yet another object of the invention is to facilitate sharing of the memory and storage systems of a computer by a plurality of users.

The above and other objects are achieved, according to the present invention, by a computer system comprising: a storage and control unit including means for receiving and processing input data signals and means for producing output signals based on the input data signals; an input/output unit including means for generating input signals and output means for providing a display based on output signals; and means forming a wireless link between the units for conducting data signals from the means for generating input signals to the means for receiving and processing input signals and for conducting output signals from the means for producing output signals to the output means.

Since one unit of the computer need only include an input device, typically a keyboard, and an output device, typically a display, as well as a transceiver unit, this unit can be relatively light in weight and hence portable. At the same time, the central processing unit and any desired peripherals, e.g., hard disc drives, printers, telephone modems, etc., form parts of another unit which can be allowed to remain stationary. Therefore, these peripherals can have any desired size and capacity without interfering with the portability of the unit containing data input and output devices.

Such an arrangement will permit a wide variety of applications to be implemented more rapidly and conveniently. For example, the user can move with great ease from one location to another within a defined work area to obtain information which can then be inputted to the computer. At each location, the user continues to control computer operation and receive an output display.

The storage and control unit can be constructed in a manner similar to conventional basic computer systems or work stations, to include a CPU with microprocessor, input/output interfaces, memories and disc drives. According to the invention, such a unit will be supplemented by a wireless transceiver constructed to exchange signals with the input/output unit.

The input/output unit differs from known devices in that, in its preferred form of construction, it consists only of a keyboard and a display device, along with an associated transceiver unit. The manner in which power is supplied to the input/output unit will depend primarily on the nature of the display device. If that display device includes a cathode-ray tube, it would be most appropriate for power to be supplied from the building mains. If the display is of the liquid crystal type, the entire input/output unit, including its associated transceiver, could be powered by replaceable or rechargeable batteries. The display employed in the input/output unit could also be of the gas plasma type, or other known type.

The invention could also be employed in conjunction with workstations, minicomputers or mainframe computers and with computers connected into a network.

In addition, information, including data and programming, could be exchanged between several input/output units coupled to a single storage and control unit via wireless links.

Further, a single storage and control unit could be shared by one or more users provided with respective input/output units and a further user stationed at a keyboard and monitor which are connected to the storage and control unit by the usual connecting cables. The latter user, perhaps a teacher, could control the sharing process under control of appropriate programming hardware switches.

DESCRIPTION OF THE PREFERRED EMBODIMENTS

Figure 1:
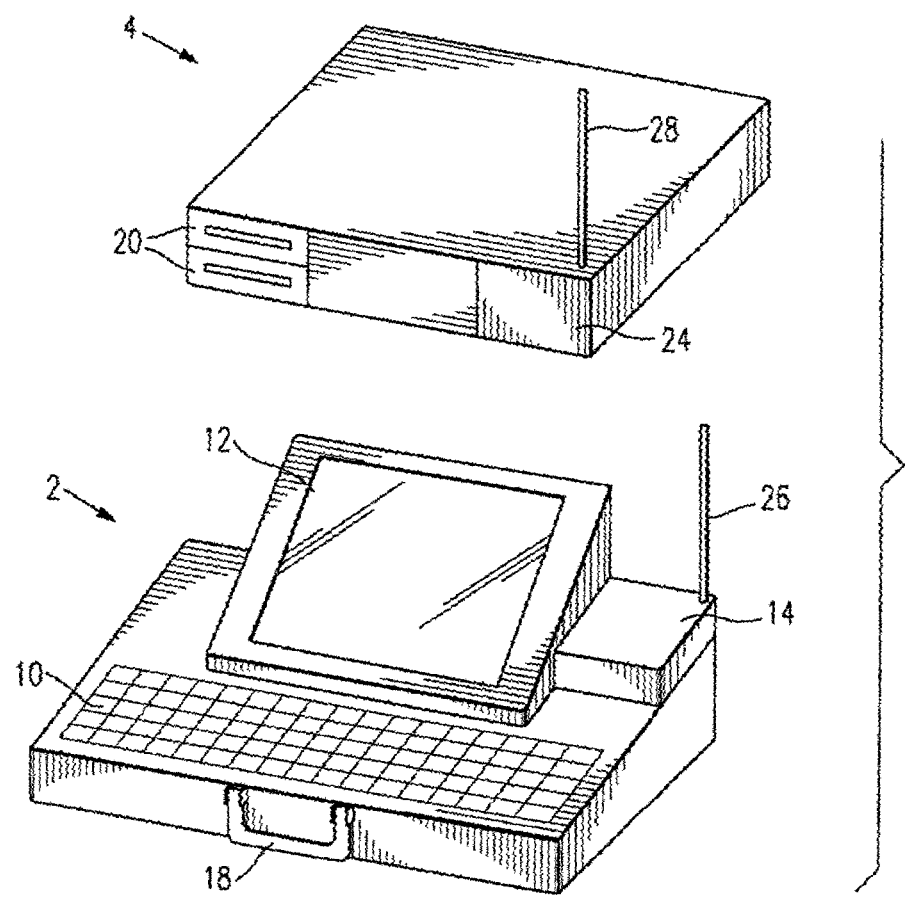
FIG. 1 is a perspective view of one preferred embodiment of a computer system according to the present invention.

The system shown in FIG. 1 is composed of two structurally separate units: an input/output unit 2: and a storage and control unit 4.

Unit 2 is composed essentially of three components, a keyboard 10, a monochrome or color display device 12 and a wireless transceiver device 14. Unit 2 will further be composed of a power supply (not shown) which may be connected to the building mains via a plug-in power cord, or which may be battery operated. The type of power supply employed will depend primarily on the nature of display device 12, since operating power for keyboard 10 and transceiver 14 can be effectively supplied by either type of power supply.

Unit 2 can be provided with interfaces for connection of alternate input devices, such as a mouse, a track ball, or a pattern recognition pad.

Because of the limited number of components forming unit 2, this can be conveniently constructed to have the general form of a briefcase, including a carrying handle 18. Unit 2 can then be easily transported from one location to another within the operating range of the wireless link associated with the computer system. Unit 2 could optionally be provided with a protective cover which would cover keyboard 10 and display device 12, and possibly also transceiver 14, when the computer system is not in use or when unit 2 is being transported from one operating location to another.

Unit 4 can be quite comparable to a basic computer system, which typically includes all necessary computer components except for display and input devices. Unit 4, thus, contains a CPU with microprocessor, memory, input/output interfaces and a variety of disc drives, including CD-ROMs. Unit 4 may be connected to any number of peripheral devices, including telephone modems, printers and larger storage units. The number of peripheral devices connected to unit 4 will not interfere 10 with the convenience offered by the computer system according to the present invention since unit 4 is intended to remain stationary.

Unit 4 does differ from conventional consoles in that it includes a transceiver 24 which, as will be explained in greater detail below, can communicate with transceiver 14, for which purpose each transceiver is provided with an antenna 26, 28.

Figure 2:
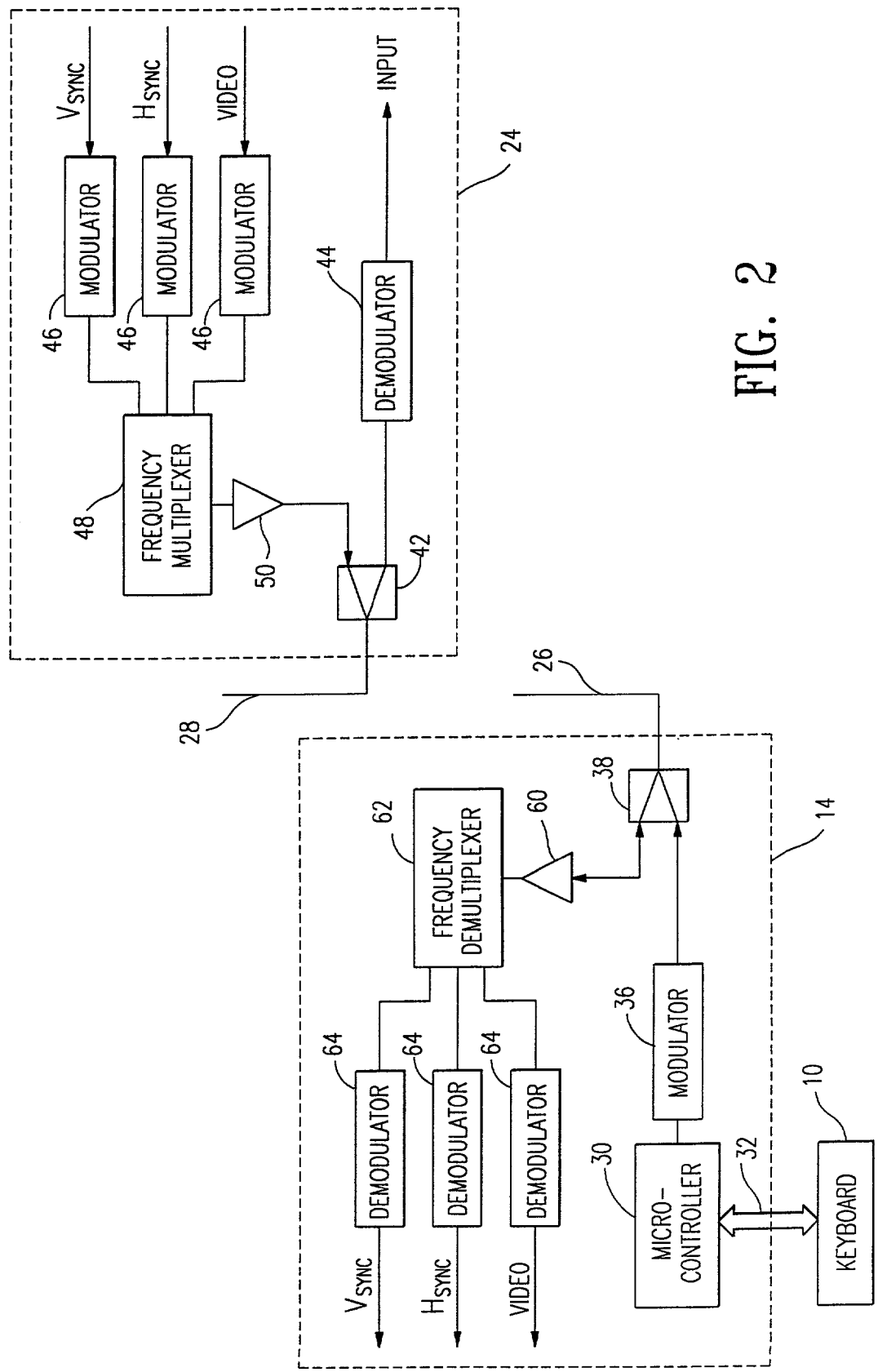
FIG. 2 is a block diagram of one suitable embodiment of a communication link between the two components of the system shown in FIG. 1.

It should be apparent from the description provided thus far that all of the components of a computer system according to the invention can be produced in the conventional manner, with the exception of transceivers 14 and 24, one preferred embodiment of which is shown in FIG. 2.

Referring to FIG. 2, keyboard 10 is typically composed of a wire matrix whose intersections are connected together by depression of respective keys. In a known manner, the wires of this matrix may be coupled to a microcontroller 30 via a suitable bus 32. Microcontroller 30 can be one component of transceiver 14 or can be installed in unit 2 and connected to transceiver 14. Microcontroller 30 can be constructed in the manner disclosed, for example, in U.S. Pat. Nos. 4,628,541 and 4,649,373, although other circuit arrangements are possible. Essentially, microcontroller 30 includes its own clock, which need not be synchronized with the clock in unit 4. The output signal from microcontroller 30 is a serial signal identifying the current state of keyboard 10. This serial signal may be an asynchronous signal which can be decoded in unit 4 with the aid of an auxiliary clock signal generated therein. Alternatively, the technology exists for transmitting an asynchronous signal in a form which permits automatic clock recovery at the receiving end.

The signal produced by microcontroller 30 is delivered to a suitable modulator 36 and from there to the input of a directional coupler 38 connected to antenna 26. Modulator 36 could include, or be supplemented by, a signal amplifier, if necessary.

The resulting signal emitted by antenna 26 will be received by antenna 28 of transceiver 24 and conducted 10 via a second directional coupler 42 and a suitable demodulator 44 to an input circuit within unit 4. This circuit may have the form disclosed in connection with FIG. 4 of U.S. Pat. No. 4,628,541. Of course, any other suitable receiving circuit can be employed.

In a conventional computer, there will be generated, at an output port, video and horizontal and vertical synchronizing signals which are supplied individually to a monitor. In a system according to the present invention, these signals are transmitted also via the wireless link, from unit 4 to unit 2. Thus, as further illustrated in FIG. 2, by way of one example, the synchronizing signals, $V_{sync}$ and $H_{sync}$, and the video signal are each modulated in a respective modulator 46, each modulator providing a carrier signal having a frequency which differs from one modulator to the other and which is modulated with its associated input signal.

The various signals exchanged by units 2 and 4 may be analog or digital in nature. Typically, the keyboard signals will be digital and the monitor signals analog. Either type of signal may be modulated in any suitable manner without altering its basic form. The modulation can be AM or FM or spread spectrum modulation and the latter offers certain advantages since it permits transmission at low power levels and is relatively immune to interference.

The output signals from modulators 46 are then delivered to inputs of a frequency multiplexer 48 and, if necessary, the multiplexed signal can be conducted through a power amplifier 50 and via directional coupler 42 to antenna 28.

The radiated signal arriving at antenna 26 is conducted by directional coupler 38 via an input amplifier 60 to a frequency demultiplexer 62 which acts to divide the received signal into the three carrier frequencies produced by modulators 46. Alternatively, the video signal can be a composite signal which can be transmitted over a single channel and requires only a single modulator 46 and demodulator 64.

Each of the resulting signals is conducted to a 10 respective demodulator 64, from which the resulting demodulated signals, corresponding to those supplied to modulators 46, may be delivered to the respective inputs of display device 12.

It will be appreciated that in the construction of embodiments according to the present invention, a variety of modulation schemes can be employed, and only one of these schemes is illustrated and disclosed herein, purely by way of example. The wireless link between antennas 26 and 28 can be provided by an electromagnetic signal at any frequency level sufficient to contain all of the information to be transmitted. The wireless link could also be constituted by an infrared signal, although at the present time this is not preferred because the exchange of signals by infrared radiation requires not only a line-of-sight relation between units 2 and 4, but also that the units have a certain orientation relative to one another.

If it should be desired to transmit keyboard signals from transceiver 14 during periods when information signals are being conducted from transceiver 24, the $V_{sync}$ pulses at the output of the associated demodulator 64 could be employed to activate modulator 36 and initiate transmission of keyboard data in serial form by microcontroller 30.

The form of the display signal can be varied according to the nature of display device 12. Thus, this signal may have the form of a composite video signal, a single signal containing picture and sync information, an RGB signal, etc.

Figure 3:
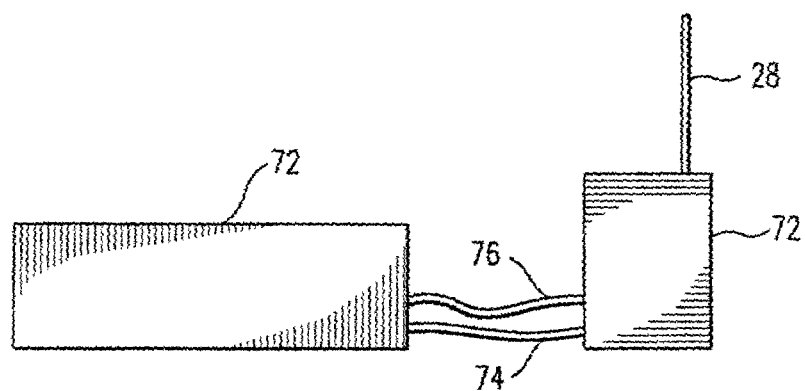
FIG. 3 is a pictorial view of a second embodiment of one part of a system according to the invention.

According to another embodiment of the invention, illustrated in FIG. 3, the unit 4 for FIG. 1 is constructed in two parts, a unit 70 containing all of the components of a conventional CPU, and a transceiver unit 72 containing all of the components of transceiver 24 of FIGS. 1 and 2, including antenna 28, and coupled to unit 70 by an input cable 74 and an output cable 76.

This arrangement offers the notable advantage that unit 70 can be constituted by a conventional computer "box," i.e. containing a CPU, disk drives, memory, controllers and interfaces, but excluding a keyboard a monitor, connected to transceiver 72 by cables 74 and 76. Thus, to utilize the present invention, the owner of a computer would need to purchase only unit 2 of FIG. 1 and transceiver 72.

According to another embodiment of the invention, the graphics display capability of the system could be enhanced by constructing device 12 as a high resolution display device, including a suitable graphics card in unit 2 and installing a special interface card in unit 4. In a conventional computer system having graphics display capabilities, picture information is supplied to a graphics card via a multiline data bus conducting bit signals in parallel and is stored in a memory under control of address signals generated in unit 4. The picture information is then read out to deliver picture signals to the display device. In this embodiment of the invention, the parallel bit signals containing picture information, and associated address signals, are conducted from the data bus and an address bus to the special interface card and are converted, in the special interface card, into a serial bit stream which is then supplied to a channel defined by transceiver 24. The serial bit stream is modulated and transmitted to transceiver 14. From transceiver 14, the picture information is conducted, under control of the address signals, to appropriate memory locations of the graphics card and the stored information is then supplied to the display device. With this arrangement, new picture information must be transmitted only when there is a change in some part of the displayed image. Therefore, high resolution graphics images can be displayed at input/output unit 2 without requiring a high capacity channel for transmitting the picture information. Information to update the display can be transmitted in bursts.

As noted earlier, systems according to the invention can include a plurality of input/output units 2, with the wireless link being constructed and connected to couple a single storage and control unit 4 to all of the input/output units 2. In such embodiment, storage and control unit 4 is provided with suitable programming for establishing a predetermined priority of communication between storage and control unit 4 and all of the input/output units 2.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A wireless computer system comprising:
    a base storage and control system including:
        a processor, receiving and using an input signal in real-time, the input signal being for use in interacting with an application program being executable at the base storage and control system,
        a non-volatile memory,
        a display element producing an output signal based on the input signal and execution of the application program, said output signal being produced in bursts, with delays between the bursts, during which delays, no information is transmitted, and
        a wireless transceiver that wirelessly communicate the display output signal when produced;
    at least one portable input-output system for use with the base storage and control system, the portable input-output system including:
        a wireless transceiver, which wirelessly communicates the input signal to the base storage and control system and wirelessly receives the display output signal from the base storage and control system,
        a user interface, allowing inputting an information item and generating an input signal corresponding to the information item the input signal being wirelessly communicable in real-time to the base storage and control system to interact with the application program being executable at the base storage and control system, and
        an arrangement for providing a continuously-displayed full screen display using the display output signal received in bursts to generate a portion of the full screen display corresponding to the display output signal.

2. The wireless computer system of claim 1, wherein at least one of a radio frequency signal and an electromagnetic frequency signal is used as a communication signal by said wireless transceivers.

3. The wireless computer system of claim 2, wherein:
    the communication signal has a wavelength longer than an infrared signal wavelength, and
    the communication signal includes at least one of a modulated signal, an amplitude modulated signal, a frequency modulated signal, and a spread spectrum modulated signal.

4. The wireless computer system of claim 1, wherein the output display signal includes at least one of a video signal, a video synchronizing signal, a horizontal video synchronizing signal, a vertical video synchronizing signal, a composite video signal, a video and synchronizing signal, and an RGB signal.

5. The wireless computer system of claim 1, wherein the input signal is a keyboard signal.

6. The wireless computer system of claim 1, wherein;
    the input signal is a keyboard signal and the output display signal includes at least one of a video signal, a video synchronizing signal, a horizontal video synchronizing signal, a vertical video synchronizing signal, a composite video signal, a video and synchronizing signal, and an RGB signal.

7. The wireless computer system of claim 1, wherein at least the input signal is an asynchronous signal.

8. The wireless computer system of claim 1, wherein said wireless transceivers each include:
  an antenna;
  an arrangement for demodulating a communicated signal corresponding to at least one of the input signal and the output display signal; and
  an arrangement for modulating at least one of the input signal and the output display signal.

9. The wireless computer system of claim 8, wherein said wireless transceivers each include a directional coupler, the directional coupler being coupled to the antenna.

10. The wireless computer system of claim 1, wherein for an existing full screen display at the at least one portable input-output, the burst provides new graphics information for a changed portion of the existing full screen display.

11. A wireless computer system comprising:
  a) a base storage and control system including:
    means for receiving and using an input signal in real-time, the input signal being for use in interacting with an application program being executable at the base storage and control system,
    means for providing non-volatile storage of information,
    means for providing a display output signal based on the input signal and execution of the application program, said output signal being produced in bursts, with delays between the bursts, during which delays, no information is transmitted, and
    means for wirelessly receiving the input signal and for wirelessly communicating the display output signal;
  b) at least one portable input-output system for use with the base storage and control system, the portable input-output system including:
    means for wirelessly communicating the input signal to the base storage and control system and for wirelessly receiving the display output signal from the base storage and control system,
    means for inputting an information i-tern and for generating the input signal corresponding to the information item, the input signal being wirelessly communicable to the base storage and control system to interact with the application program that is executable at the base storage and control system, and
    means for providing a full screen display by directly using the display output signal to generate a portion of the full screen display corresponding to the display output signal.

12. A wireless computer system comprising:
  a base storage and control system including:
    a processor, receiving and using an input signal in real-time, the input signal being for use in interacting with an application program being executable at the base storage and control system,
    a non-volatile memory,
    a display element producing an output signal based on the input signal and execution of the application program, said output signal being produced in bursts, with delays between the bursts, during which delays, no information is transmitted, and
    a wireless transceiver that wirelessly communicate the display output signal when produced in bursts;
  at least one portable input-output system for use with the base storage and control system, the portable input-output system including:
    a wireless transceiver, which wirelessly communicates the input signal to the base storage and control system and wirelessly receives the display output signal from the base storage and control system,
    a user interface, allowing inputting an information item and generating an input signal corresponding to the information item, the input signal being wirelessly communicable in real-time to the base storage and control system to interact with the application program being executable at the base storage and control system, and
    an arrangement for providing a continuously-displayed full screen display that differs from a previously-received full screen display, using the display output signal received in bursts to generate a portion of the full screen display corresponding to the display output signal.

* * * * *